(12) United States Patent
Aila et al.

(10) Patent No.: US 8,977,049 B2
(45) Date of Patent: Mar. 10, 2015

(54) SYSTEM AND METHOD FOR ESTIMATING SIGNAL-DEPENDENT NOISE OF AN IMAGE

(75) Inventors: Timo Aila, Helsinki (FI); Samuli Laine, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 834 days.

(21) Appl. No.: 12/684,663

(22) Filed: Jan. 8, 2010

(65) Prior Publication Data

US 2011/0170773 A1 Jul. 14, 2011

(51) Int. Cl.
*G06K 9/40* (2006.01)
*G06T 5/00* (2006.01)

(52) U.S. Cl.
CPC .................................. *G06T 5/002* (2013.01)
USPC ........... 382/167; 348/162; 348/607; 348/624; 348/625; 348/701; 382/128; 382/132; 382/173; 382/195; 382/286

(58) Field of Classification Search
None
See application file for complete search history.

(56) References Cited

U.S. PATENT DOCUMENTS

| | | | | |
|---|---|---|---|---|
| 4,602,282 | A * | 7/1986 | Kurono et al. | 348/162 |
| 5,983,251 | A * | 11/1999 | Martens et al. | 708/203 |
| 6,307,888 | B1 * | 10/2001 | Le Clerc | 375/240.29 |
| 7,995,828 | B2 * | 8/2011 | Wang et al. | 382/132 |
| 2005/0012866 | A1 * | 1/2005 | Chiang et al. | 348/625 |
| 2005/0271298 | A1 * | 12/2005 | Yu | 382/286 |
| 2007/0109448 | A1 * | 5/2007 | Winger et al. | 348/624 |
| 2007/0182862 | A1 * | 8/2007 | Li et al. | 348/701 |
| 2008/0085060 | A1 * | 4/2008 | Bosco et al. | 382/264 |
| 2008/0144933 | A1 * | 6/2008 | Or et al. | 382/173 |
| 2008/0231753 | A1 * | 9/2008 | Fujiwara et al. | 348/607 |
| 2009/0116713 | A1 * | 5/2009 | Yan et al. | 382/128 |
| 2009/0161980 | A1 * | 6/2009 | Wang et al. | 382/264 |
| 2009/0324089 | A1 * | 12/2009 | Morita | 382/195 |

OTHER PUBLICATIONS

Liu, Freeman, Szeliski, Kang, "Noise Estimation from a Single Image", Proc. IEEE CVPR 2006.

* cited by examiner

*Primary Examiner* — Tsung-Yin Tsai
(74) *Attorney, Agent, or Firm* — Zilka-Kotab, PC

(57) ABSTRACT

A method for estimating signal-dependent noise includes defining a plurality of pixel groups from among the image pixels. The method further includes computing, for one or more signal levels of the image, a difference value between two pixel groups, whereby a respective one or more difference values are computed collectively. The method determines an estimated noise response of the image as a function of the one or more computed difference values.

21 Claims, 5 Drawing Sheets

Difference value (Np1, Np2) = $\Sigma\ |N_{p1}(i) - N_{p2}(i)|$

SYSTEM AND METHOD FOR ESTIMATING SIGNAL-DEPENDENT NOISE OF AN IMAGE

BACKGROUND

The present invention relates to systems and methods for estimating noise, and more particularly to systems and methods for estimating signal-dependent noise of images.

Noise in images, e.g., photographs, has several causes including the physical design of cameras (heat, quantization, etc), non-linearities in image processing pipelines, and photon noise due to insufficient exposure time. Some of these, e.g. photon noise, depend on the image signal level and therefore it is desirable to estimate the amount of noise of the image as a function of the image signal level.

Many conventional methods provide techniques for estimating signal-independent noise of images. These methods provide only a single value (typically, one standard deviation, $\sigma$) that is intended to describe the amount of noise in the image. While this is much easier than obtaining a separate estimate for each signal level, the problem is still seriously ill-posed. Given only the observed image I, the goal is to estimate the latent image O and signal-independent noise P so that $$I(x,y)=O(x,y)+P(x,y) \quad \text{eq. (1)}$$

Typically, it is assumed that P follows Gaussian distribution with zero mean and $\sigma$ a standard deviation, and the above problem then simplifies to $$I(x,y)=O(x,y)+\text{Gaussian}(0,\sigma) \quad \text{eq. (2)}$$

While the characteristics of noise are now known (assuming the noise is signal-independent Gaussian), separation is not possible without additional information. Conventional methods make the assumption that noise is high frequency and the latent image O is not. This allows reasonably good separation in many cases, but the downside is an inevitable loss of high-frequency detail such as textures.

What is needed is an improved technique for estimating noise in images which can avoid the loss of high frequency details of the image.

SUMMARY

A system and method for estimating signal-dependent noise of an image are presented herein which addresses the foregoing difficulties. An exemplary method includes defining a plurality of pixel groups from among the image pixels. The method further includes computing, for one or more signal levels of the image, a difference value between two pixel groups, whereby a respective one or more difference values are computed collectively. The method determines an estimated noise response of the image as a function of the one or more computed difference values.

These and other features of the invention will be better understood in view of the following figures and corresponding description of exemplary embodiments.

For clarity, previously-referred to features retain their reference indices in subsequent drawings.

DETAILED DESCRIPTION OF EXEMPLARY EMBODIMENTS

The present invention builds upon the assumption that most noise-free images contain many virtually identical "pixel groups" or "pixel neighborhoods" somewhere in the image. In particular, a noise-free image O is expected to have a certain degree of self-similarity, whereas noise should be free of such structure. This observation is exploited to ascertain a signal level dependent noise response of an image, as now described below.

Figure 1:
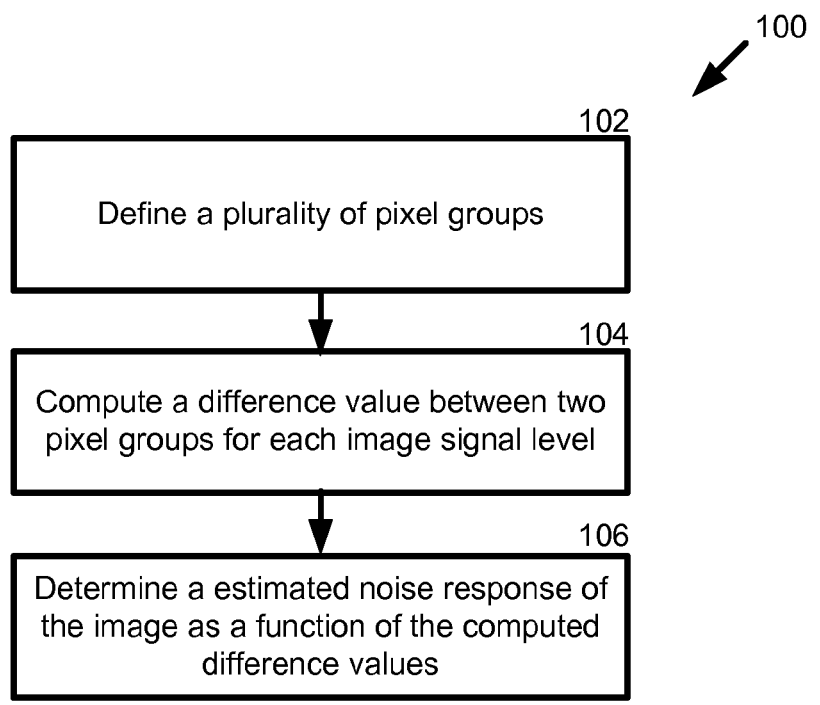
FIG. 1 illustrates a method for estimating noise of an image in accordance with the present invention.

FIG. 1 illustrates a method 100 for determining a noise response of an image, the image composed of a plurality of image pixels exhibiting different signal levels present within the image. The image's signal level may represent the pixel's intensity/brightness, the pixel's color value, a combination of different color values, the pixel's depth value, or any other signal level characteristic. In an exemplary embodiment, the image is a digital image obtained by means of a digital imaging system, such as a digital camera. In another embodiment, the image is a digital image which is stored in a memory.

At 102, a plurality of pixel groups are defined from among the plurality of image pixels. At 104, for one or more signal levels of the image (herein "image signal level"), a difference is computed between two pixel groups, whereby a respective one or more difference values are computed collectively. At 106, an estimated noise response of the image is determined as a function of the one or more difference values computed at each of the image signal levels, the estimated noise response describing the noise characteristics of the image.

Figure 2:
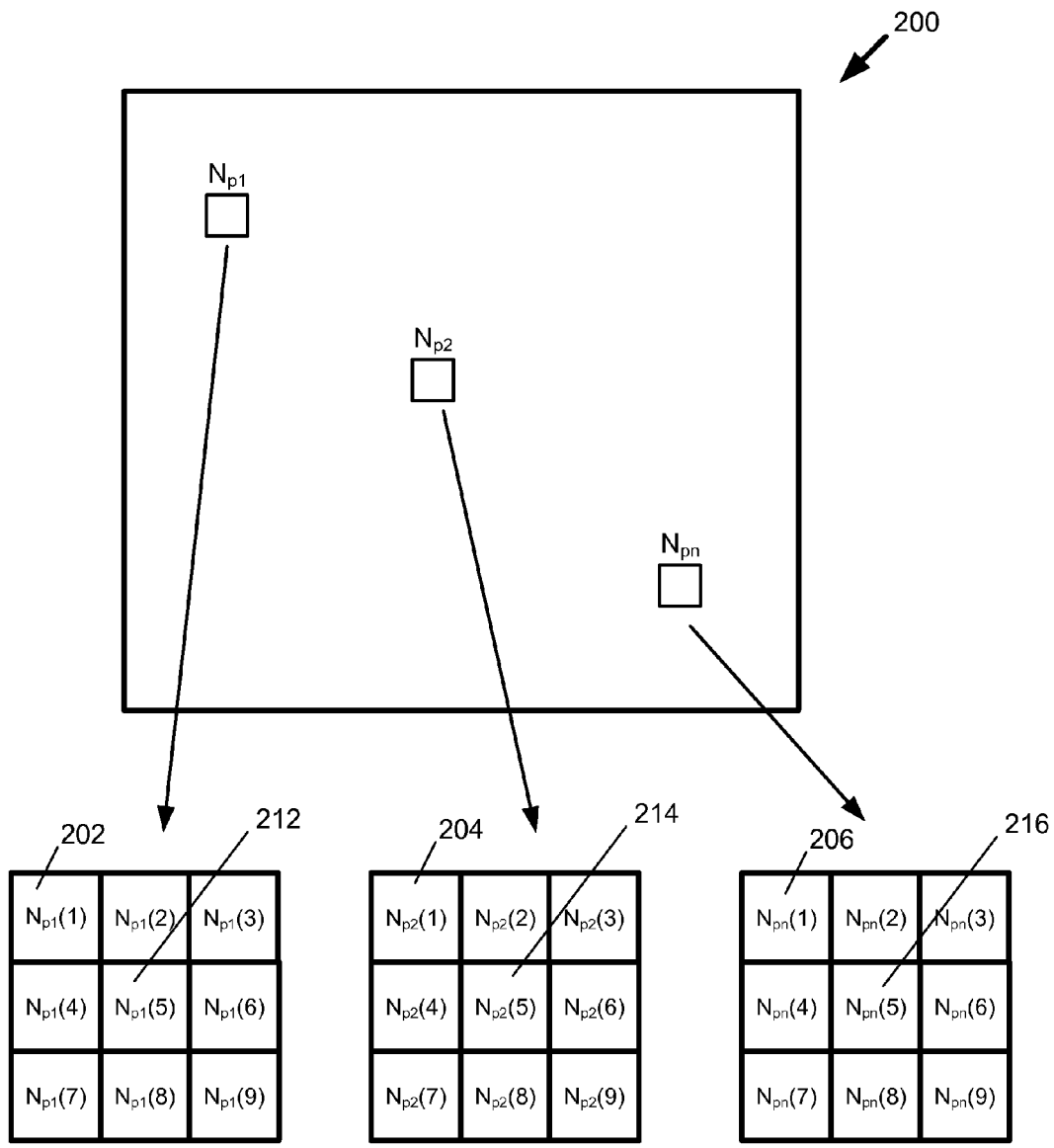
FIG. 2 illustrates an exemplary image in which pixel groups are selected in accordance with the method of FIG. 1.

FIG. 2 illustrates an exemplary image 200 in which pixel groups are selected in accordance with operation 102 shown in FIG. 1. The image 200 includes exemplary pixel groups or "pixel neighborhoods" $N_{p1}$-$N_{pn}$, each pixel group being a 3×3 square of 3 pixels by 3 pixels, although the pixel groups can be of an arbitrary size, dimension or shape. Exemplary, pixel groups corresponding to a particular signal level are of the same size in order to allow the computation of a difference value between corresponding pixels therebetween. Also exemplary, pixels within a particular group form a contiguous group, although in another embodiment, one or more pixels may be spaced apart from others within in the same pixel group. Further exemplary, all pixel groups across all signal levels are of the same size. In the illustrated exemplary embodiment, the dimension of all pixel groups is N×N, so that each group is of a square dimension. Further illustrated, N is an odd number, such that each pixel group includes a center pixel. Alternatively, the pixel groups are of a non-square dimension, i.e. N×P, where N≠P. The size of the group (N and/or P quantity) is taken into account in determining the image's estimated noise response in one embodiment of the invention, further described below. The number of pixel groups used in the method 200 is arbitrary, and may range from tens, hundreds, thousands, tens of thousands, hundreds of thousands, millions, or more. Further exemplary, the number of pixels included within a group may range from 2 to tens, hundreds, thousands, or more.

As shown, each pixel group $N_{p1}$, $N_{p2}$ and $N_{pn}$ includes a plurality of pixels, and pixels located at the same relative location within each pixel group are herein referred to as "corresponding" pixels. For example, pixels 202, 204 and 206 represent corresponding pixels in each of the first, second and $n^{th}$ pixel groups $N_{p1}$, $N_{p2}$ and $N_{pn}$, respectively.

Further exemplary, each pixel group may include a reference pixel, the reference pixel having a signal level which is included in the image. The reference pixel may be any pixel within the group, for example, the center pixel if the pixel group is dimensioned to have one. In the exemplary embodiment of FIG. 2, center pixels 212, 214 and 216 operate as the reference pixels for groups $N_{p1}$, $N_{p2}$ and $N_{pn}$, respectively. The reference pixels may be used to determine which of the image signal levels a computed difference value corresponds or contributes to, as will be further described below.

Operation 104 involves computing a difference value between two pixel groups for one or more image signal levels. In one embodiment, a single image signal level is implemented, and one or more difference values are computed therefore in operation 104. In another embodiment of the invention, two or more image signal levels are implemented, and one or more difference values are computed for each of the plurality of image signal levels in operation 104. Further exemplary, the image signal levels may be signal levels which are present (rendered) within the image, or they may be signal levels which are interpolated between signal levels present within the image. In an example of the latter further illustrated below, an average value of two image signal levels present within the image is taken as a common image signal level for which a difference value is computed, such an average value which may represent an interpolated signal level of the image.

In an exemplary embodiment, the difference value is computed as the accumulated absolute difference between signal levels of corresponding pixels within the two pixel groups. For example, if the first and second pixel groups $N_{p1}$ and $N_{p2}$ are selected (e.g., their respective reference pixels are of the same signal level value or within the same predefined signal level range), then the difference value computed therebetween would be:

$$\text{Difference value}(N_{p1}, N_{p2}) = \Sigma |N_{p1}(i) - N_{p2}(i)| \qquad \text{eq. (3)}$$

wherein $N_{p1}(i)$ and $N_{p2}(i)$ are the signal level values of corresponding pixels i, with i ranging from 1 to 9 in the exemplary embodiment of FIG. 2.

In a further specific embodiment, operation 104 involves computing the L2 norm (Euclidian distance) between the first and second groups:

$$dist(p_1, p_2) = \left[\frac{1}{M}\sum_i^M (N_{p1}(i) - N_{p2}(i))^2\right]^{0.5} \qquad \text{eq. (4)}$$

where:
 dist(p1,p2) is the difference value (more specifically, the Euclidian distance) between the first and second groups centered around reference pixels $p_1$ and $p_2$, respectively;
 $N_{p1}(i)$ is the signal level of an $i^{th}$ pixel in a first pixel group $N_{p1}$ having M pixels; and
 $N_{p2}(i)$ is the signal level of a corresponding $i^{th}$ pixel in a second pixel group $N_{p2}$ having M pixels.

In a specific embodiment, the first and second pixel groups $N_{p1}$ and $N_{p2}$ are of the same size M (i.e., number of pixels) and shape, and pixel groups of any size and shape may be employed. In a further specific embodiment, the first and second pixel groups $N_{p1}$ and $N_{p2}$ are of a square shape, where the size M of each pixel group is a square N×N pixel array, where N is any integer. Still further exemplary, N is an odd integer, thereby providing square pixel groups having a center pixel, an example of which is shown in FIG. 2 above.

Each computed difference value "contributes to," or is associated with a particular signal level, and the image signal level to which a computed difference value contributes can be determined in a variety ways. In one embodiment, the computed difference value contributes to that image signal level which is an average value of the signal levels of the reference pixels for the two pixel groups from which the difference value is computed. In such an embodiment, the image signal level may be present (rendered) within the image, or it may represent an interpolated image signal level. In another embodiment, the computed difference value contributes to that image signal level which is an average value of the signal levels of the pixels of the two pixel groups from which the difference value is computed. In yet another embodiment, two pixel groups will contribute to an image signal level if the average signal levels of pixels within each group agree within a predefined range. In general, an image signal level represents a signal level value or range of signal level values for which one or more difference values are computed. That is, each image signal level can be seen as a "bin" or "bucket" for which one or more difference values are computed.

Operation 106 involves determining the estimated noise response of the image as a function of the one or more computed difference values. In one embodiment, one image signal level is implemented for the image, whereby a difference value is computed for the single image signal level in operation 104, and the estimated noise response computed in operation 106 is a single data point based upon the computed difference value. In another embodiment, two or more image signal levels are implemented for the image, whereby in operation 104, a difference value is computed for each of the image signal levels, and the estimated noise response computed in operation 106 includes multiple data points corresponding to the multiple difference values computed in operation 104. More particularly regarding the embodiment in which multiple signal levels are implemented, the computed difference values are used as data points to form a piecewise linear approximation of the estimated noise response of the image, although other type of approximations (linear or non-linear) may be used in alternative embodiments. Further particularly, multiple (i.e., separate) estimated noise responses may be obtained. For example, an estimated noise response for each of red, green and blue channels of the acquired image may be obtained according to operations 102, 104 and 106.

The number of image signal levels implemented in operations 104 and 106 may range from one to any arbitrary number. In the embodiment in which a single image signal level is implemented in operations 104 and 106, the estimated noise response computed in operation 106 will be a single point response. In the embodiment in which multiple image signal levels are implemented in operations 104 and 106, the estimated noise response computed in operation 106 will include a respective plurality of data points corresponding to the plurality of image signal levels. Exemplary of the latter embodiment, the number of image signal levels may be 2, 4, 8, 16, 32, 64, 128, 171, 256, 512, 1028, or more. Further particularly, the method of FIG. 1 may be implemented so that a difference value can be computed for every $n^{th}$ image signal level.

Figure 3:
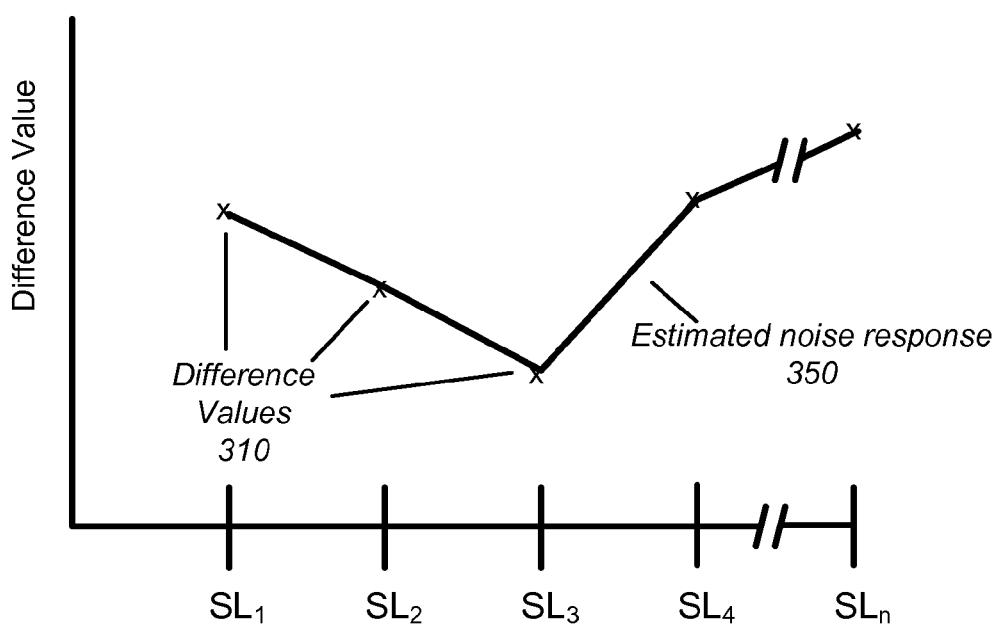
FIG. 3 illustrates an estimated noise response of an image obtained in accordance with the method of FIG. 1.

FIG. 3 illustrates an estimated noise response of an image obtained in accordance with the method of FIG. 1. Difference values 310 are computed in accordance with operation 104 described above, either in accordance with eq. (3) or eq. (4), and the process is repeated (either sequentially or concurrently) at each of the signal levels $SL_1$-$SL_n$. The estimated noise response 350 is shown as a piecewise linear interpolation of the difference values 310.

Figure 4:
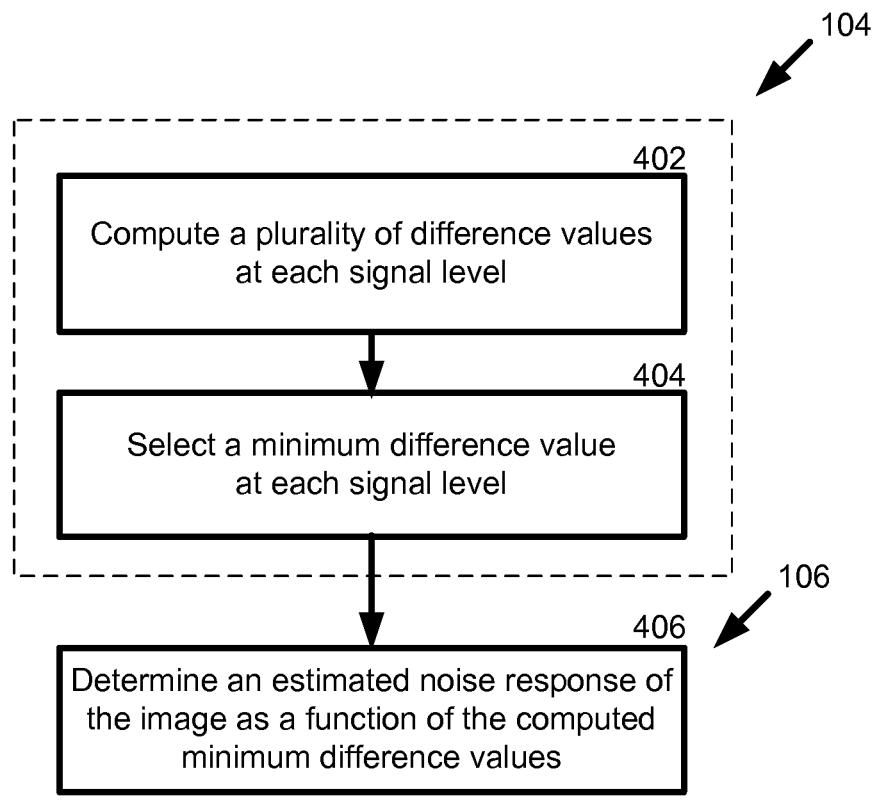
FIG. 4 illustrates exemplary embodiments of the method of FIG. 1.

FIG. 4 illustrates exemplary embodiments of operations 104 and 106 in FIG. 1. In an exemplary embodiment of operation 104, a plurality of difference values is computed at each image signal level (operation 402). That is, three or more pixel groups within image 200 are selected for computation of a difference value at the same signal level (or within the same signal level range), and a corresponding two or more difference values are computed therefrom. At 404, a minimum difference value is selected from among the plurality of difference values computed for each signal level. Operation 406 represents an exemplary embodiment of operation 406, in which an estimated noise response of the image is computed as a function of the identified minimum difference value(s). As described above in relation to FIG. 1, the number of minimum difference values employed in operation 406 may be a single one corresponding to a single image signal level to provide a single point noise estimation response, or they may number two or more corresponding to a respective two or more image signal levels to provide a multi-point estimated noise response for the image. In the case of the latter, a piece-wise linear (or other linear or non-linear) approximation may be used to construct the estimated noise response for the image.

The minimum difference value represents the pixel groups having the most similar image signal levels. Further, if it is assumed that a noise-free image will include a number of pixel groups which are virtually identical, then the computed difference values (e.g., the L2 norm distances) for such groups will be zero or near-zero. Accordingly, the non-zero value of such a difference can be attributed to the image's noise component. The skilled person will appreciate that under the present invention high frequency textures will not be confused with noise, as textures will typically include structural features present in multiple pixel groups. As such, computing difference values across those pixel groups would result in a zero or near-zero difference value in a noise-free image.

Figure 5:
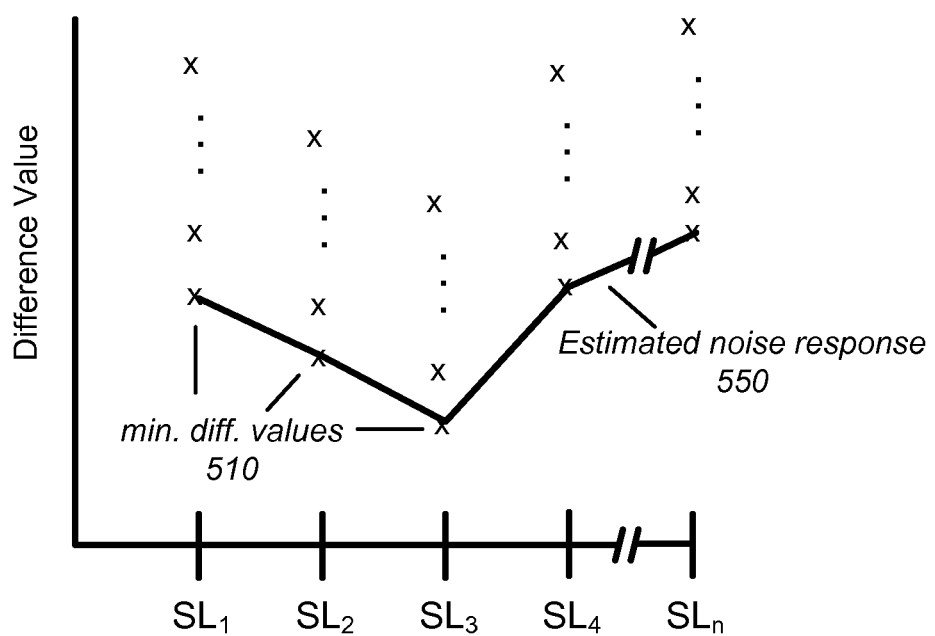
FIG. 5 illustrates an estimated noise response obtained in accordance with the method shown in FIG. 4.

FIG. 5 illustrates an estimated noise response obtained in accordance with the method shown in FIG. 4. Minimum difference values 510 are computed in accordance with operations 402 and 404 described above, and the process is repeated (either sequentially or concurrently) at each of the image signal levels $SL_1$-$SL_n$. The estimated noise response 550 is shown as a piecewise linear interpolation of the difference values 510.

As will be appreciated by the skilled person, the quality of the match between the compared pixel groups, i.e., how close to zero the difference value is, is a function of the size/dimension of the compared pixel groups. In particular, pixel groups of a smaller size will have a greater probability of matching, whereas larger pixel groups will be more difficult to match.

Based on numerical simulations using Gaussian noise with zero mean and σ standard deviation on a single-color image (group distance in the noise-free image is 0) and computing a difference value in accordance with eq(4) above, exemplary probabilities of finding a reference pixel pair (p1,p2) for which a corresponding difference value, e.g., dist(p1,p2)<σ is approximately:

TABLE I

| For a 5 × 5 pixel group: | $P_{5\times5}(<\sigma) = 0.02$ |
| For a 7 × 7 pixel group: | $P_{7\times7}(<\sigma) = 0.002$ |
| For a 9 × 9 pixel group: | $P_{9\times9}(<\sigma) = 0.0001$ |
| For a 11 × 11 pixel group: | $P_{11\times11}(<\sigma) = 0.000006$ |

It can be seen from Table I that the probability of finding a match better than σ is rather small when the group grows in size. Furthermore, it can be understood that $P(<0.5\sigma)$ is very close to 0 for pixel groups that are 7×7 or larger. Also, $P(<2\sigma)$ is very close to 1 for all pixel group sizes, implying that if dist(p1,p2) in the image is greater than 2σ, the latent image groups are probably not very similar.

The information in Table I provides a further means for more accurately estimating the noise response of the image. In particular, the information predicts that for a particular signal level, difference values which have been influenced by noise can be expected to occur within a band ranging between the lowest computed distance value and a predefined upper level, for example, four times the lowest computed difference value. The upper limit, corresponding to the condition in which $P(<2\sigma)$ is very close to 1 for all group sizes, can be any particular level based upon the level of confidence needed/required. For example, the upper limit can be a factor of 1.5×, 2×, 3×, 5×, 4×, 8× (or more) higher than the lowest computed difference value.

It can be further deduced from Table I that the lowest computed difference value may not represent an accurate minimum distance value, but rather one of the samples that are smaller than the true standard deviation σ of the image signal level. Taking the illustrated example in which the pixel group size is 7×7 pixels, the probability of finding a difference value lower than the noise floor σ is 0.002, as $P_{7\times7}(<\sigma)=0.002$. Further, assuming that the number of difference values obtained between the lowest and twice the lowest computed difference values is a known quantity, for example 10,000, the number of difference values occurring below the noise level σ can be computed as 10,000×0.002=20.

Accordingly, this number of lowest computed values can be rejected from the computed difference values at the signal level, and the remaining difference values considered in accordance with the operations 106. More particularly, the remaining difference values can be considered as difference values which do not underestimate the noise occurring within the image, the lowest of which would be selected according to operation 306 for the particular signal level. This process would apply to all signal levels employing the same pixel group size and sample size.

Figure 6:
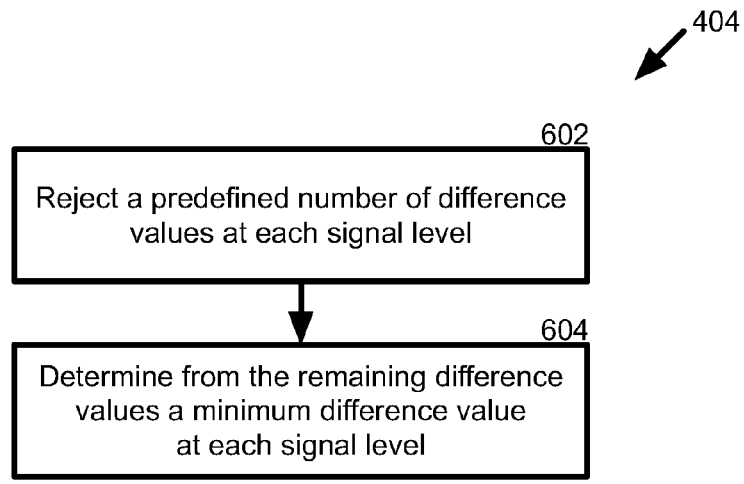
FIG. 6 illustrates exemplary embodiments of the method of FIG. 1.

FIG. 6 illustrates an exemplary embodiment of operation 404 in FIG. 4 in accordance with the aforementioned analysis. At 602, a predefined number of difference values are rejected at each signal level. At 604, a minimum distance value is determined from the remaining difference values.

In an exemplary embodiment of the invention, the predefined number of difference values rejected in operation 602 is computed according to the equation:

$$\#reject = \#samples * P(<\sigma) \quad \text{eq. (5)}$$

where:

$P(<\sigma)$ is the probability associated with finding a difference value which is smaller than one standard deviation σ of the image signal level, the standard deviation σ computed as a function of the dimension of the pixel groups at the signal level, samples is the number of samples (difference values) occurring within a predefined range of difference values at the signal level, and reject is the number of difference values to be rejected at the signal level.

In an exemplary embodiment, the quantity #samples is the number of samples (difference values) occurring between the lowest computed difference value and a multiple thereof, e.g., 1.5×, 2×, 3×, 4×, 8×, or more greater, as noted above. Further exemplary, the quantity $P(<\sigma)$ is computed using Monte Carlo sampling in a noise-only image. In another embodiment, the quantity $P(<\sigma)$ may be estimated analytically by approximating the difference value distribution with an analytically integrable distribution (such as normal distribution).

The above-described methods can be employed to estimate a signal-dependent noise response of an image, i.e., to estimate noise of the image over several different image signal levels, thus providing a means for more accurately quantifying noise (e.g., photon noise) within the image. Imaging processes which can be improved by this enhancement include motion estimation, de-noising, super-resolution, shape-from-shading, and feature extraction processes. Particular applications of the methods in FIGS. 1, 4 and 6 include image processing, such as digital photography, or post-processing applications, such as image editing.

Figure 7:
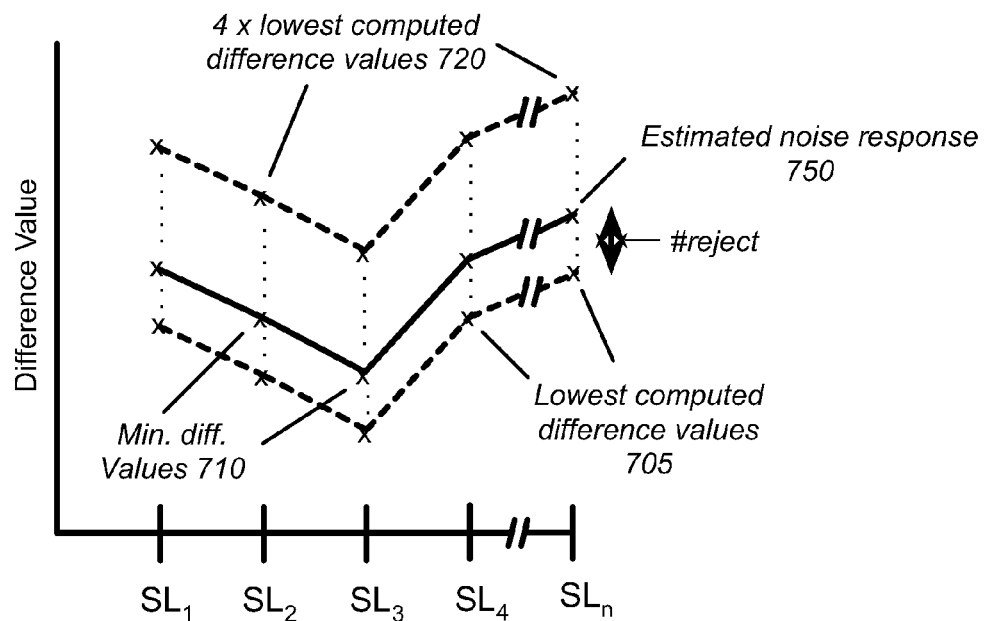
FIG. 7 illustrates an estimated noise response obtained in accordance with the method shown in FIG. 6.

FIG. 7 illustrates an estimated noise response obtained in accordance with the method shown in FIG. 6. Difference values (e.g., L2 norm distances) are computed at each of the image signal levels (e.g., image intensity levels). The computed difference values are limited to a predefined range from the lowest value 705 to four times the lowest computed difference value 720, and difference values above this range are rejected. The range may be further reduced if the pixel group size permits, as described above. Further particular, the quantity $P(<\sigma)$ is computed (or its value retrieved from memory) and multiplied with the number of samples within the defined band, and a total number of computed difference values #reject rejected for the signal level. The lowest remaining minimum difference value is selected as the minimum distance value 710 for the signal level, and the process is repeated (either sequentially or concurrently) at each of the image signal levels $SL_1$-$SL_n$. An estimated noise response 750 is computed as a function of the minimum difference values 710, for example using a piecewise linear approximation.

Figure 8:
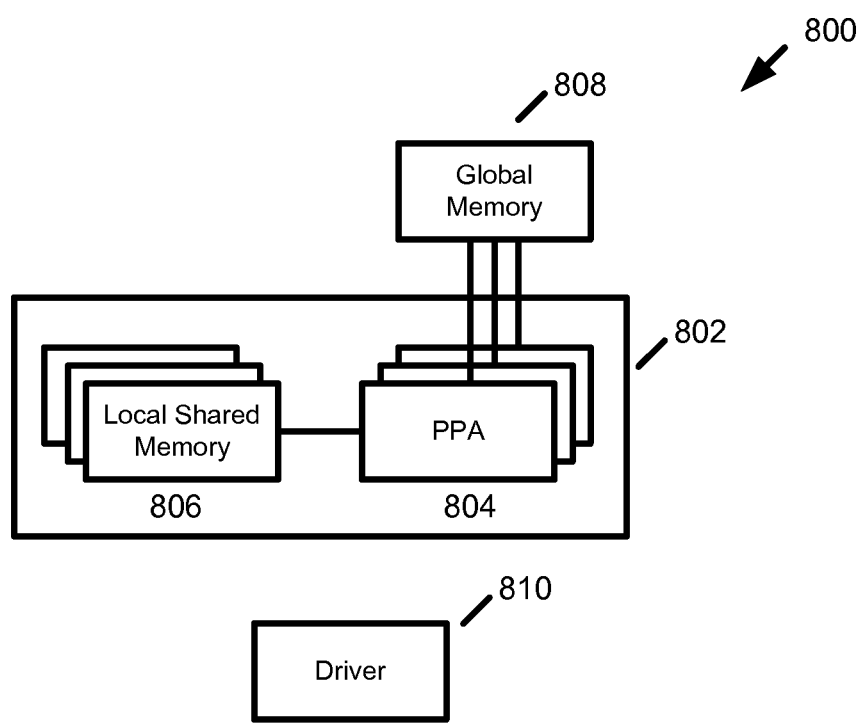
FIG. 8 illustrates an exemplary system operable to perform the operations shown in FIGS. 1, 4 and 6.

FIG. 8 illustrates an exemplary system 800 operable to perform the operations illustrated in FIGS. 1, 4 and 6 in accordance with the present invention. System 800 includes a processor 802, which includes a plurality of parallel processing architectures 804, each configured to operate on a predetermined number of threads. Accordingly, each parallel processing architecture 804 may operate in parallel, while the corresponding threads may also operate in parallel. In a particular embodiment, the parallel processing architecture 804 is a single instruction multiple data (SIMD) architecture of a predefined SIMD width, for example 32, 64, or 128 threads.

The processor 802 may further include local shared memory 806, which may be physically or logically allocated to a corresponding parallel processing architecture 804. The system 800 may additionally include a global memory 808 which is accessible to each of the parallel processing architectures 804. The system 800 may further include one or more drivers 810 for controlling the operation of the processor 802 in accordance with the methods of FIGS. 1, 4 and 6. The driver(s) 810 may include one or more libraries for facilitating control of the processor 802. In one embodiment, the system 800 is included within in a graphics card. In another embodiment, the system 800 is included within the motherboard of an imaging system, e.g., a digital camera. The system 800 may be implemented in other components, for example, a computer or a game console, or in an embedded system, such as in a cellular telephone.

The processor circuitry of the processor 802 is operable to perform (e.g., execute instructions to carry out) any of the operations illustrated in FIGS. 1, 4 and 6 herein. In an embodiment exemplified by FIG. 1, circuitry of processor 802 (herein "processor circuitry") is operable to define groups of image pixels from among the plurality of image pixels. The processor circuitry is further operable to compute, for each of a plurality of different image signal levels, a difference value between two pixel groups. The processor circuitry is further operable to determine an estimated noise response of the image as a function of the computed difference values.

In an embodiment exemplified by FIG. 4, the processor circuitry is operable to compute a plurality of difference values at each signal level, and select a minimum difference value from among the plurality of difference values for each signal level, whereby one minimum difference value is obtained at each signal level. The processor circuitry is further operable to determine an estimated noise response of the acquired image as a function of the plurality of minimum difference values.

In an embodiment exemplified by FIG. 6, the processor circuitry is operable to reject from the plurality of difference values computed at each signal level, a predefined number of the difference values, and to determine from the remaining difference values the minimum difference value for each signal level. Further exemplary, the processor circuitry is operable to compute the number of difference values rejected according to eq. (4) above.

As readily appreciated by those skilled in the art, the described processes and operations may be implemented in hardware, software (a computer program element), firmware or a combination of these implementations as appropriate. In addition, some or all of the described processes and operations may be implemented as computer readable instruction code resident on a computer readable medium or product, the instruction code operable to control a computer of other such programmable device to carry out the intended functions. The computer readable medium on which the instruction code resides may take various forms, for example, a removable disk, volatile or non-volatile memory 908, etc.

The terms "a" or "an" are used to refer to one, or more than one feature described thereby. Furthermore, the term "coupled" or "connected" refers to features which are in communication with each other (electrically, mechanically, thermally, optically, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. The described features are not limited only to their implementation in the exemplary embodiment described therefor, and the skilled person will appreciate that these features can be implemented in the other described embodiments of the invention as well. Reference indicia (if any) included in the claims serve to refer to one exemplary embodiment of a claimed feature, and the claimed feature is not limited to the particular embodiment referred to by the reference indicia. The scope of the claimed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for estimating noise in an image, the image including a plurality of image pixels, the method comprising:
   (i) defining a plurality of non-overlapping pixel groups from among the image pixels;
   (ii) for a first signal level, computing a first difference value between two pixel groups of the non-overlapping pixel groups, wherein the first signal level represents a depth; and
   (iii) determining an estimated noise response of the image as a function of the first computed difference value, wherein each pixel group includes a reference pixel, and further comprising selecting the two pixel groups when values of the first signal level for the respective reference pixels are within a predefined signal level range.

2. The method of claim 1, wherein pixels located at the same relative position within each pixel group comprise corresponding pixels, and wherein (ii) comprises computing an accumulated absolute difference between the first signal levels of corresponding image pixels in the two pixel groups.

3. The method of claim 1, wherein the first difference value in (ii) comprises a L2 distance between the two pixel groups computed according to the equation:

$$dist(p_1, p_2) = \left[\frac{1}{M}\sum_{i}^{M}(N_{p1}(i) - N_{p2}(i))^2\right]^{0.5}$$

wherein dist(p1,p2) is the first difference value;
wherein $N_{p1}(i)$ is the first signal level of an $i^{th}$ pixel in a first pixel group $N_{p1}$ having M image pixels; and
wherein $N_{p2}(i)$ is the first signal level of a corresponding $i^{th}$ pixel in a second pixel group $N_{p2}$ having M image pixels.

4. The method of claim 1,
wherein (ii) comprises:
   computing a plurality of first difference values at the first signal level; and
   selecting a minimum first difference value from among the plurality of first difference values for the first signal level,
   wherein one minimum first difference value is obtained at the first signal level; and
wherein (iii) comprises determining an estimated noise response of the image as a function of the one or more minimum first difference values.

5. The method of claim 4, wherein (ii) further comprises:
rejecting from the plurality of first difference values at the first signal level, a predefined number of the first difference values,
wherein the minimum first difference value for the first signal level is determined from the remaining first difference values.

6. The method of claim 5, wherein the predefined number of first difference values rejected at the first signal level is computed according to the equation:

reject=#samples*$P(<\sigma)$ wherein #reject is the number of first difference values rejected at the first signal level;
wherein $P(<\sigma)$ is the probability associated with finding a first difference value which is smaller than one standard deviation $\sigma$, the standard deviation $\sigma$ computed as a function of the size M of the first and second pixel groups; and
wherein #samples is the number of samples occurring within a predefined range of first difference values at the first signal level.

7. The method of claim 1, wherein the first pixel group is a non-contiguous pixel group such that one pixel in the first pixel group is spaced apart from all other pixels in the first pixel group.

8. The method of claim 1, further comprising, for a second signal level representing color or intensity, computing a second difference value between the two pixel groups, and wherein the estimated noise response of the image is computed as a function of the second computed difference value and the first computed difference value.

9. A processor operable to estimate noise in an image, the image including a plurality of image pixels exhibiting different signal levels present within the image, the processor comprising:
   (i) processor circuitry operable to define a plurality of non-overlapping pixel groups from among the image pixels;
   (ii) processor circuitry operable to compute, for a first signal level, a first difference value between two pixel groups of the non-overlapping pixel groups, wherein the first signal level represents a depth; and
   (iii) processor circuitry operable to determine an estimated noise response of the image as a function of the first computed difference value, wherein each pixel group includes a reference pixel, and wherein processor circuitry comprises processor circuitry operable to select the two pixel groups when values of the first signal level for the respective reference pixels are within a predefined signal level range.

10. The processor of claim 9, wherein pixels located at the same relative position within each pixel group comprise corresponding pixels, and wherein (ii) processor circuitry comprises processor circuitry operable to compute an accumulated absolute difference between the first signal levels of corresponding image pixels in the two pixel groups.

11. The processor of claim 9, wherein the (ii) processor circuitry is operable to compute the first distance as a L2 distance between the two pixel groups ($N_{p1}$, $N_{p2}$) according to the equation:

$$dist(p_1, p_2) = \left[\frac{1}{M}\sum_{i}^{M}(N_{p1}(i) - N_{p2}(i))^2\right]^{0.5}$$

wherein dist(p1,p2) is the first difference value;
wherein $N_{p1}(i)$ is the first signal level of an $i^{th}$ pixel in a first pixel group $N_{p1}$ having M image pixels; and wherein $N_{p2}(i)$ is the first signal level of a corresponding $i^{th}$ pixel in a second pixel group $N_{p2}$ having M image pixels.

12. The processor of claim 9,
wherein (ii) processor circuitry comprises:
 processor circuitry operable to compute a plurality of first difference values at the first signal level; and
 processor circuitry operable to select a minimum first difference value from among the plurality of first difference values for the first signal level,
 wherein one minimum first difference value is obtained at the first signal level; and
 wherein (iii) processor circuitry comprises processor circuitry operable to determine an estimated noise response of the image as a function of the one or more minimum first difference values.

13. The processor of claim 12, wherein (ii) processor circuitry further comprises:
 processor circuitry operable to reject from the plurality of first difference values at the first signal level, a predefined number of the first difference values,
 wherein the minimum first difference value for the first signal level is determined from the remaining first difference values.

14. The processor of claim 13 wherein the predefined number of first difference values rejected at the first signal level is computed according to the equation:

reject=#samples*$P(<\sigma)$ wherein #reject is the number of first difference values rejected at the first signal level;
 wherein $P(<\sigma)$ is the probability associated with finding a first difference value which is smaller than one standard deviation $\sigma$, the standard deviation $\sigma$ computed as a function of the size M of the first and second pixel groups; and
 wherein #samples is the number of samples occurring within a predefined range of first difference values at the first signal level.

15. The processor of claim 9, further comprising, processor circuitry operable to compute, for a second signal level representing color or intensity, a second difference value between the two pixel groups, and wherein the estimated noise response of the image is computed as a function of the second computed difference value and the first computed difference value.

16. A computer program product, resident on a non-transitory computer readable medium, operable to store executable instructions for estimating noise in an image, the image including a plurality of image pixels, the computer program product comprising:
 (i) instruction code to define a plurality of non-overlapping pixel groups from among the image pixels;
 (ii) instruction code to compute, for a first signal level, a first difference value between two pixel groups of the non-overlapping pixel groups, wherein the first signal level represents a depth;
 (iii) instruction code to determine an estimated noise response of the image as a function of the first computed difference value; and
 (iv) instruction code to compute, for a second signal level representing color or intensity, a second difference value between the two pixel groups, and wherein the estimated noise response of the image is computed as a function of the second computed difference value and the first computed difference value.

17. The computer program product of claim 16, wherein pixels located at the same relative position within each pixel group comprise corresponding pixels, and wherein (ii) instruction code comprises instruction code to compute an accumulated absolute difference between the first signal levels of corresponding image pixels in the two pixel groups.

18. The computer program product of claim 16, wherein the first difference value in (ii) comprises a L2 distance between the two pixel groups computed according to the equation:

$$dist(p_1, p_2) = \left[ \frac{1}{M} \sum_{i}^{M} (N_{p1}(i) - N_{p2}(i))^2 \right]^{0.5}$$

wherein dist(p1,p2) is the first difference value;
wherein $N_{p1}(i)$ is the first signal level of an $i^{th}$ pixel in a first pixel group $N_{p1}$ having M image pixels; and
wherein $N_{p2}(i)$ is the first signal level of a corresponding $i^{th}$ pixel in a second pixel group $N_{p2}$ having M image pixels.

19. The computer program product of claim 16,
wherein (ii) instruction code comprises:
 instruction code to compute a plurality of first difference values at the first signal level; and
 instruction code to select a minimum first difference value from among the plurality of first difference values for the first signal level,
 wherein one minimum first difference value is obtained at the first signal level; and
 wherein (iii) instruction code comprises instruction code to determine an estimated noise response of the image as a function of the one or more minimum first difference values.

20. The computer program product of claim 19, wherein (ii) instruction code further comprises:
 instruction code to reject from the plurality of first difference values at the first signal level, a predefined number of the first difference values,
 wherein the minimum first difference value for the first signal level is determined from the remaining first difference values.

21. The computer program product of claim 20, wherein the predefined number of first difference values rejected at the first signal level is computed according to the equation:

reject=#samples*$P(<\sigma)$ wherein #reject is the number of first difference values rejected at the first signal level;
 wherein $P(<\sigma)$ is the probability associated with finding a first difference value which is smaller than one standard deviation $\sigma$, the standard deviation $\sigma$ computed as a function of the size M of the first and second pixel groups; and
 wherein #samples is the number of samples occurring within a predefined range of first difference values at the first signal level.

* * * * *